(12) United States Patent
Pulizzi

(10) Patent No.: US 6,782,617 B2
(45) Date of Patent: Aug. 31, 2004

(54) ELECTRICAL EQUIPMENT AND METHOD OF ASSEMBLING SAME

(75) Inventor: Peter S. Pulizzi, Fountain Valley, CA (US)

(73) Assignee: Pulizzi Engineering Inc., Santa Clara, CA (US)

( * ) Notice: Subject to any disclaimer, the term of this patent is extended or adjusted under 35 U.S.C. 154(b) by 670 days.

(21) Appl. No.: 09/849,464

(22) Filed: May 4, 2001

(65) Prior Publication Data

US 2004/0077212 A1 Apr. 22, 2004

Related U.S. Application Data

(62) Division of application No. 09/436,842, filed on Nov. 9, 1999, now Pat. No. 6,250,956.

(51) Int. Cl.[7] .............................................. H05K 13/00
(52) U.S. Cl. ............................. 29/854; 29/825; 29/832; 29/842
(58) Field of Search ......................... 29/825, 832, 842, 29/854

(56) References Cited

U.S. PATENT DOCUMENTS

| | | | | |
|---|---|---|---|---|
| 5,392,192 A | * | 2/1995 | Dunn et al. ................. | 361/683 |
| 6,362,425 B1 | * | 3/2002 | Chilton et al. ................ | 174/51 |
| 6,590,848 B1 | * | 7/2003 | Chen ......................... | 369/75.1 |

* cited by examiner

Primary Examiner—Carl J. Arbes
(74) Attorney, Agent, or Firm—Howard R. Lambert

(57) ABSTRACT

Electrical equipment is disclosed that comprises a front-mounting electrical component, such as an IEC connector, a switch, a circuit breaker or a lamp or indicator. The electrical component has a body with a retaining shoulder at an outside end region and electrical terminals projecting from an inside end region. Included is an equipment enclosure, such as a chassis box, having sides, a selected one of the sides being formed with a cutout for receiving the retaining shoulder of the front-mounting electrical component. Also included is an electrical component retaining plate having a front side and a back side and having a cutout into which is received, from the front side of the plate, the body of the front-mounting electrical component so as to install the electrical component in the retaining plate. The plate is sized to fit against an inside surface of the selected enclosure side so that the shoulder of the front-mounting electrical component installed in the plate cutout is aligned with the cutout in the selected enclosure side. Screws detachably attach the plate to the selected enclosure side with the front side of the plate against the inside surface of the selected enclosure side, with the shoulder of the front-mounting electrical component installed in plate received into the enclosure side cutout. Electrical connections, which may be electrical wires or a printed circuit card, are attached to electrical terminals of the front-mounting electrical component installed in the plate and projecting from the back side of the plate. There is described a corresponding method of assembling electrical equipment using front-mounting electrical components. Equipment variations are described.

14 Claims, 5 Drawing Sheets

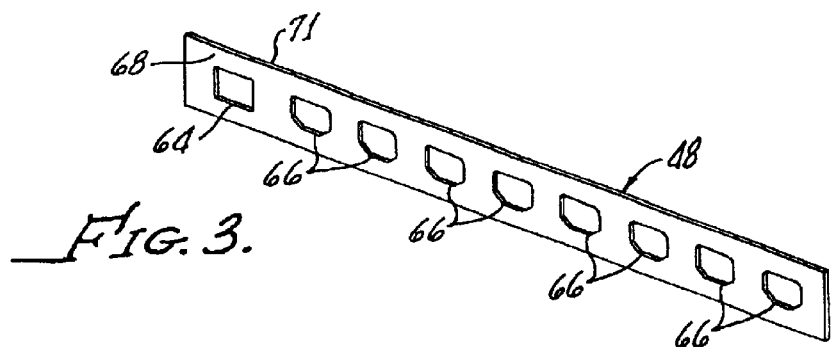
FIG. 3.
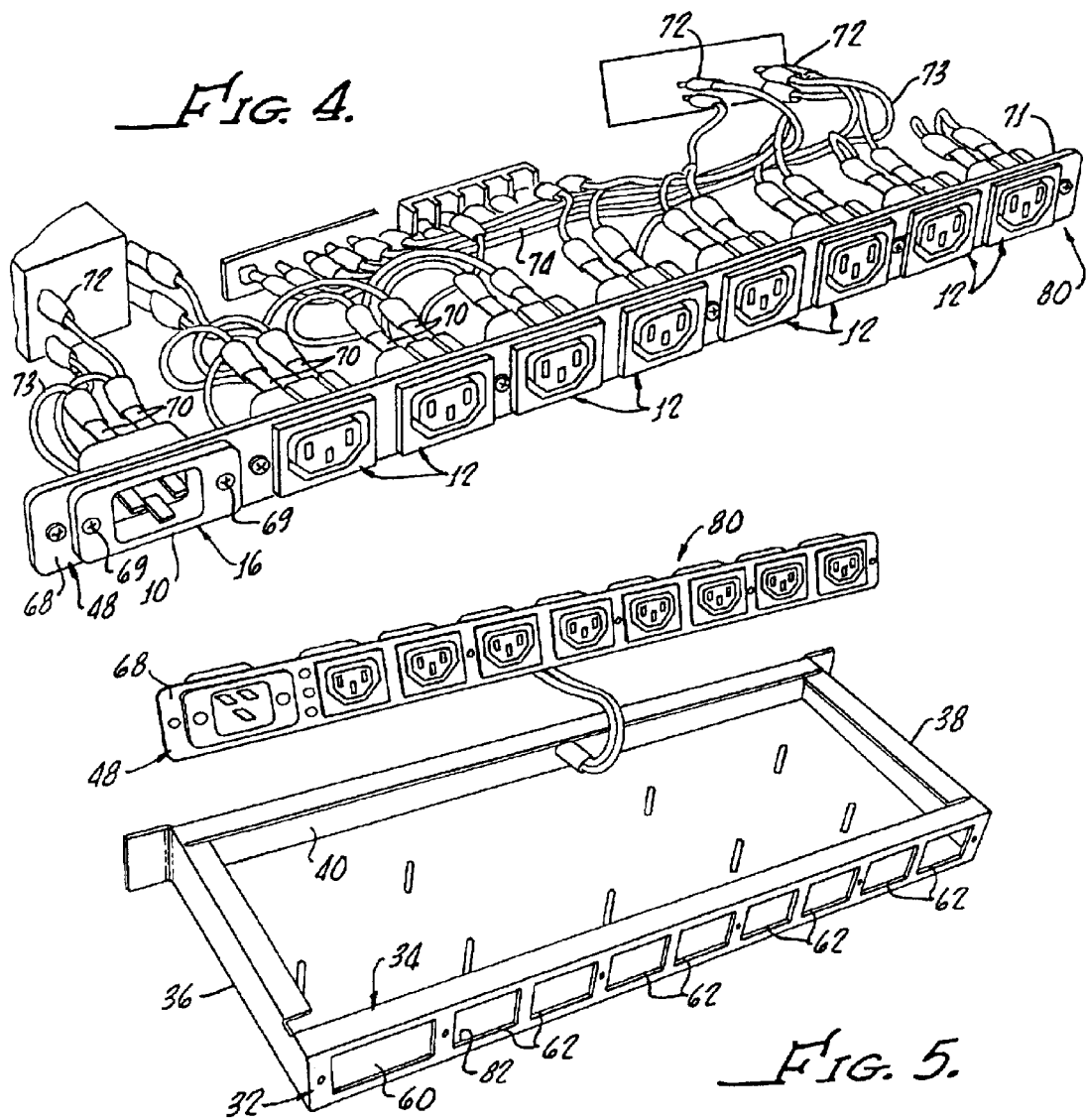
FIG. 4.
FIG. 5.

ELECTRICAL EQUIPMENT AND METHOD OF ASSEMBLING SAME

This application is a divisional application of application Ser. No. 09/436,842, filed Nov. 9, 1999, now U.S. Pat. No. 6,250,956.

BACKGROUND OF THE INVENTION

1. Field of the Invention

The present invention relates generally to electrical (including electronic) equipment and to the assembly thereof; and more particularly to electrical equipment and assembly thereof using such front-mounting electrical components as international electrical code (IEC) inlet (male) and outlet (female) connectors, switches (e.g., rocker switches), circuit breakers, panel lights and indicators that install into equipment chassis box walls from outside the box.

2. Background Discussion

The manufacture and assembly of a great many types of electrical equipment housed in chassis boxes (including other enclosures) use one or more electrical components that are installed into the chassis box from outside the box. Such front-mounting electrical components include, without limitation, IEC inlet and outlet connectors, switches, circuit breakers, panel lights and indicators that are constructed for easy and rapid snapping or insertion into chassis box cutouts.

After installation, these front-mounting electrical components have user-accessible or observable portions outside the chassis box and electrical connection terminals or pins that project into the box. For assembly of the equipment, electrical connections have heretofore been made inside the box to the terminals of installed front-mounting components and to other electrical components, such as relays, printed circuit cards, transformers, A-to-D converters, and microcontrollers mounted inside the chassis box.

Although front-mounting electrical components are ordinarily easy to install in chassis boxes, extensive or even moderate "inside-the-box" electrical wire connections to them and other internal components (such as those mentioned above) are often very difficult, and hence costly, to make, inspect and repair. This is especially the case when the chassis boxes are made small for conserving usually valuable equipment rack space and/or when the space provided for internal wiring is tight.

Accordingly, a principal objective of the present invention is to provide efficiently assembled electrical equipment for which the difficulty and time required for assembly using front-mounting electrical components is substantially reduced.

A related objective of the present invention is to convert, in effect, front-mounting electrical components to rear-mounting in a manner that related electrical interconnections can be easily and efficiently made outside the equipment chassis box. The electrical components and electrical interconnections can then be installed as a complete subassembly into the chassis box.

SUMMARY OF THE INVENTION

In accordance with the present invention there are provided electrical equipment and a method of assembly thereof employing rear-mounting of conventional front-mounting electrical components.

The electrical equipment comprises at least one front-mounting electrical component having a body with a retaining shoulder at an outside end region and electrical terminals projecting from an inside end region, and an enclosure having sides and a detachable top. At least one of the enclosure sides is formed having at least one cutout for receiving the shoulder of the at least one front-mounting electrical component Included is an electrical component receiving plate having a front side and a back side, the plate having at least one cutout for receiving the body of the at least one front-mounting electrical component from the front side of the plate to thereby install the at least one electrical component in the plate. The retaining plate is sized to fit against an inside surface of the at least one of the enclosure sides so that the shoulder of the at least one of the electrical components installed in the plate is aligned with the at least one enclosure wall cutout.

Means are included for attaching, preferably detachably attaching, the retaining plate to the at least one enclosure side with the front side of the plate against the inside surface of the at least one enclosure side and with the shoulder of the at least one front-mounting electrical component installed in the plate received in the at least one enclosure side cutout.

The equipment includes electrical connections attached to the electrical terminals of the at least one of the front-mounting electrical components installed in the retaining plate. The electrical connections may comprise electrical wires or a printed circuit card.

More particularly, the electrical equipment comprises a front-mounting electrical component having a body with a retaining shoulder at an outside end region of the body and electrical terminals projecting from an inside end region of the body; and an enclosure having sides, a selected one of the sides having a cutout for receiving the shoulder of the front-mounting electrical component.

An included is an electrical component retaining plate having a front side and a back side. The retaining plate is formed having a cutout for receiving the body of the front-mounting electrical component from the front side of the plate, the electrical component being thereby installed in the plate with the electrical terminals projecting from the back side of the plate. The plate is sized to fit against an inside surface of the selected enclosure side so that the shoulder of the electrical component installed in the plate is aligned with the enclosure side cutout.

Means are provided for detachably attaching the plate to the selected enclosure side with the front side of the plate against the inside surface of the selected enclosure side and with the shoulder of the electrical component installed in the plate received in the enclosure side cutout. Electrical connections, which may be electrical wires or a printed circuit card, are attached to the electrical terminals of the front-mounting electrical component installed in the retaining plate.

A corresponding method is provided for assembling electrical equipment in a chassis box using front-mounting electrical components. The method comprises the steps of providing a front-mounting electrical component, which may, for example, be an IEC inlet or outlet connector, having a body and a retaining shoulder at an outside end region of the body and having electrical terminals extending from an inside end region of the body; and forming a retaining plate sized to attach to an inside surface of a selected wall of the chassis box, the plate having a front surface and a back surface and being formed having a cutout sized for receiving the body of the front-mounting electrical component.

The method includes the further steps of inserting the body of the front-mounting electrical component into the plate cutout from the front side of the plate and making a cutout in the selected wall of the chassis box, the wall cutout being sized to receive the electrical component retaining shoulder and being located to match the plate cutout.

Still further included are the steps of attaching, preferably detachably attaching, the retaining plate to the selected chassis box wall with the front surface of the plate against the inside surface of the selected chassis box wall and with the shoulder of the electrical component installed in the plate extending into the wall cutout.

The method includes the step of making electrical connections to the electrical terminals of the electrical component and may include connecting electrical wires to the electrical terminals and bundling the wires into a wiring harness before the plate is attached to the selected chassis box wall. Alternatively, the step of making electrical connections to the electrical component electrical terminals may include connecting or soldering a printed circuit card to the electrical terminals of the electrical component installed in the plate before or after the plate is attached to the selected chassis box wall.

In a variation, the electrical terminals of the electrical component are soldered to the printed circuit card and the printed circuit card is detachably attached to the selected enclosure side by a plurality of screws and stand-offs with the shoulder of the electrical component received in a cutout in the selected enclosure side, the retaining plate being thereby eliminated.

The present invention effectively converts front-mounting electrical components into rear-mounting components for ease of assembly of the associated electrical equipment.

However, in another variation, there is provided electrical equipment which comprises a front-mounting electrical component having a body with a retaining shoulder at an outside end region of the body and electrical terminals projecting from an inside end region of the body. Included is an enclosure having sides, a selected one of the sides having a cutout into which is received the body of the front-mounting electrical component with the retaining shoulder outside the enclosure and with the electrical terminals projecting inside the enclosure. Further included is a printed circuit card connected to the electrical terminals of the electrical component received in the selected enclosure side for making electrical connections to the terminals inside the enclosure. Such connection is preferably made by connectors fixed to the printed circuit card and into which the electrical component terminals are inserted.

BRIEF DESCRIPTION OF THE DRAWINGS

The present invention can be more readily understood by a consideration of the following detailed description when taken in conjunction with the accompanying drawings, in which:

FIG. 1 is a perspective drawing of two representative types of conventional front-mounting electrical components for purposes of illustrating the present invention.

FIG. 3 is a perspective drawing of a flat electrical connector retaining plate, according to the present invention, for installation against the inner surface of the chassis box rear wall depicted in FIG. 2, showing, for descriptive purposes, one IEC inlet and eight IEC outlet connector body-receiving cutouts formed in the retaining plate for the front mounting of one IEC inlet and eight IEC outlet connectors therein;

FIG. 4 is a perspective drawing of the retaining plate of FIG. 3 showing the IEC connectors front mounted in the retaining plate from the front side thereof, and showing electrical wires connected to the electrical terminals of the connectors and further showing the electrical wires bundled together into a wiring harness to form a sub-assembly;

FIG. 5 is a perspective drawing showing the sub-assembly of FIG. 4 ready to be installed inside the chassis box (depicted in FIG. 2) against the rear chassis box wall;

In the various FIGS., the same elements and features are given the same reference numbers except as may other-wise be disclosed in the following DESCRIPTION.

DESCRIPTION OF THE PREFERRED EMBODIMENT

The present invention relates to improved electrical equipment and a simplified method of assembly thereof using one or more conventional front-mounting electrical components.

For purposes of illustrating and describing the present invention, commonly-used IEC input and output connectors are disclosed as being representative of all types of front-mounting electrical components, which include, without limitation, electrical connectors, switches, circuit breakers, panel lights and indicators, which are or could be used in the manufacture and assembly of electrical equipment.

Thus, it is to be clearly understood that the present inventor neither intends, infers nor suggests any limitation of his invention only to the use of such front-mounting IEC connectors.

With the foregoing caveat kept clearly in mind, it is known that IEC inlet (male) connectors (e.g., IEC 320 C-20 inlets) are commonly installed in such electrical equipment as computers, printers, facsimile machines and power controllers to enable the providing of electrical operating power from an external power source to the equipment. IEC outlet (female) connectors (e.g., IEC 320 C-13 outlets) are installed in many of the same types of electrical equipment to enable providing electrical power from the equipment to one or more external pieces of equipment.

These representative front-mounting IEC connectors are specifically constructed and intended for convenient insertion from the outside of an electrical equipment chassis box (including any other type of equipment enclosure) into receiving apertures in the box (for example, a rear wall of the box).

Figure 1A:
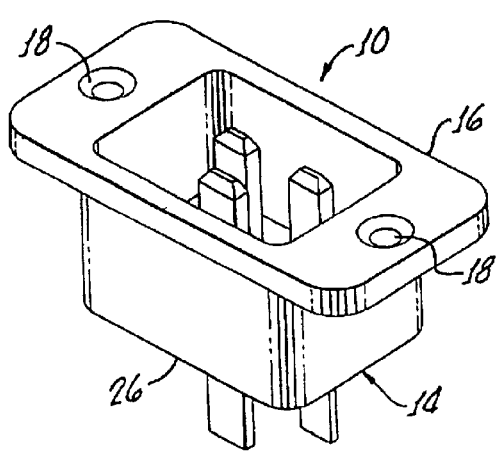
FIG. 1A is a perspective drawing of a conventional front-mounting IEC inlet (male) connector showing the connector body and the sidewardly projecting, retaining shoulder at an outside end of the body portion.
Figure 1B:
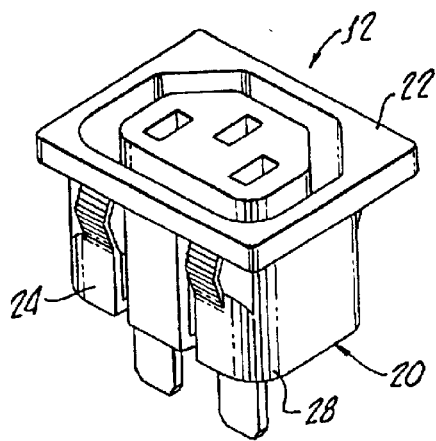
FIG. 1B is a perspective drawing of a conventional front-mounting IEC outlet (female) connector showing the connector body and the sidewardly projecting, retaining shoulder at an outside end of the body and showing an opposing pair of spring-type tabs on the body portion for releasably locking the connector in place after its installation.

For illustrative purposes, FIG. 1A depicts a front-mounting IEC inlet (male) connector 10 of the type installed in an electrical equipment chassis box (not shown), to enable the connection of an external power cord to the connector for supplying electrical power to the equipment from a power source (not shown). FIG. 1B depicts an IEC outlet (female) connector 12 of the type installed in an electrical equipment chassis box to enable the connection of an external power cord to the connector for providing electrical power by such equipment to other electrically-operated equipment (also not shown).

Representative IEC inlet connector 10 comprises a non-conductive plastic body 14 of generally rectangular cross section having a sidewardly-projecting rectangular shoulder 16 at an power input (outside the chassis box) end of the body. A pair of connector attachment holes 18 are formed in shoulder 16.

Representative IEC outlet 12 (FIG. 1B) comprises a non-conductive plastic body 20 of generally D-shaped cross section having a sidewardly-projecting rectangular retaining shoulder 22 at an power output (outside the chassis box) end of the body. A pair of leaf spring-type locking tabs 24 are provided on opposite sides of body 20 to releaseably lock connector 12 in place after its installation.

Both representative front-mounting IEC inlet and outlet connectors 10 and 12 have three flat or spade-shaped terminals (not shown in FIG. 1) projecting from respective ends 26 and 28 of bodies 14 and 20 for enabling electrical connection to the connectors.

Retaining shoulder 16 on IEC inlet connector 10 and retaining shoulder 22 on IEC outlet connector 12 limit installation of the connectors to body-first installation of the connectors. Thus, IEC connectors 10 and 12 are, like all other types of front-mounting electrical components, configured for mounting from the outside of an equipment chassis box (or the like) so that their connection terminals project into the chassis box and their user-accessible or observable ends are outside the chassis box.

Figure 2:
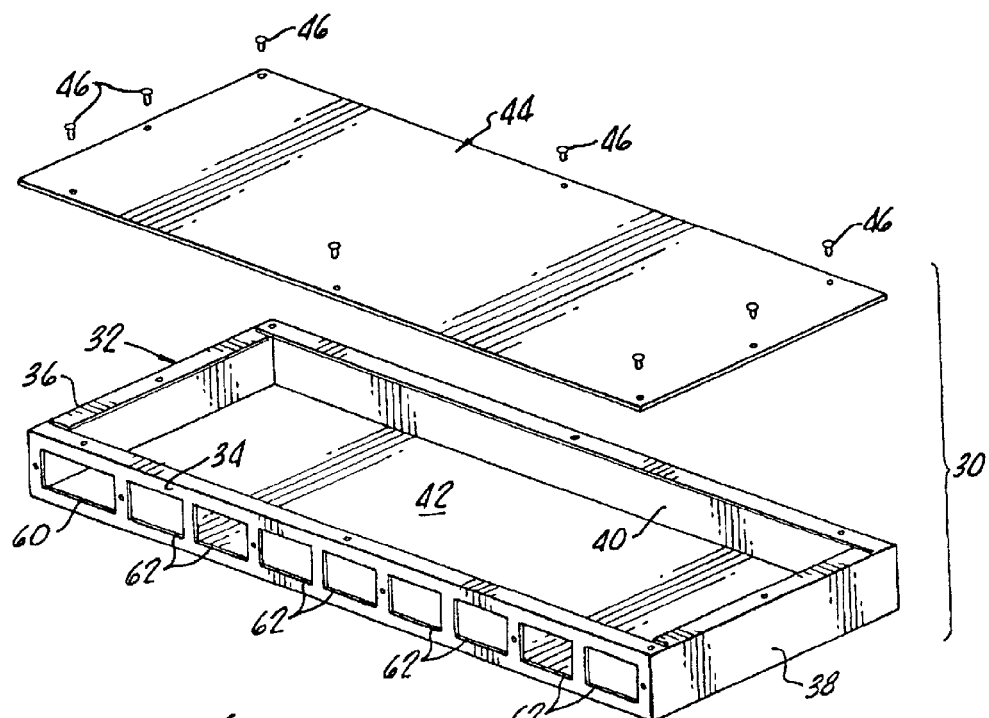
FIG. 2 is a perspective drawing of a representative electrical equipment chassis box of the general type used for a exemplary power controller, showing the general external configuration of the chassis box and further showing, solely by way of example, one IEC inlet connector shoulder-receiving and eight IEC outlet connector shoulder-receiving cutouts in a selected, rear wall of the chassis box.

By way of further example illustrating the present invention, FIG. 2 depicts a representative electrical equipment chassis box (or enclosure) 30. Shown comprising chassis box 30 are a box portion 32 having sides 34, 36, 38 and 40 and a bottom 42, and a separate cover plate 44 which is attachable to the box portion by a number of screws 46. Box portion 32 and cover plate 44 are typically constructed of 14-18 gage sheet metal.

As depicted in FIG. 2, by way of further example, side 34 (e.g., the rear wall) of box portion 32 has formed therein a single rectangular cutout or opening 60 for receiving retaining shoulder 16 of IEC inlet 10 (not shown in FIG. 2). Additionally shown are eight linearly spaced apart rectangular cutouts or openings 62 for receiving retaining shoulders 22 of eight individual IEC outlets 12 (also not shown in FIG. 2).

It will, of course, be understood that the number of cutouts 60 and 62 depends upon the number of front-mounting electrical components (in the present discussion, the number of IEC inlets and outlets) required for the electrical equipment to be assembled in chassis box 30, the location of cutouts 60 and 60 being established by the circuit layout and requirements of such electrical equipment.

FIG. 3 depicts an associated electrical component retaining or mounting plate 48 that is made to fit inside chassis box portion 32 against rear wall 34. The size of retaining plate 48, which may be constructed of 14-18 gage sheet metal or other structural material, depends upon the number and spacing of front-mounting electrical components to be provided for the associated electrical equipment to be installed in chassis box 30.

Shown formed in retaining plate 48 are a rectangular cutout or opening 64 sized to receive body 14 of IEC inlet 10 (not shown in FIG. 3) and eight generally D-shaped cutouts or openings 66 sized to bodies 20 of eight individual IEC outlets 12 (also not shown in FIG. 3).

Cutouts 60 and 62 in chassis box wall 34 and corresponding cutouts 64 and 66 in retaining plate 48 are matched as to location, the cutout locations being determined either by the circuit-required cutout locations in chassis box wall 34 or in retaining plate 48.

Continuing with the example illustrating the present invention, after appropriate cutouts 64 and 66 have been made in electrical component retaining plate 48, and with the plate outside of chassis box portion 32, one IEC inlet 10 is installed into cutout 64 in a normal manner from a front side or surface 68 of the plate. IEC inlet connector shoulder 16 is attached to plate 48 by screws 69. Eight IEC outlet connectors 12 are installed into retaining plate 48 by being snapped into corresponding plate cutouts 66 from plate front surface 68.

It is apparent that relative to retaining plate 48, IEC connectors 10 and 12 are still front mounted, assuming, as stated above, that surface 68 is the front surface of the plate.

As shown in FIG. 4, with IEC inlet and outlet connectors 10 and 12 installed in retaining plate 48 in the above-described manner and with the plate outside chassis box 30, electrical wire connections are made to electrical terminals 70 of the IEC connectors that are readily accessible from a rear side or surface 71 of the plate.

Electrical wires 73 are further connected, as appropriate, to other electrical components 72 to be installed in chassis box 30. Electrical wires 73 are then tied or otherwise secured into a compact wire bundle or harness 74.

In this manner, all such wiring is conveniently and efficiently performed in the open, outside of chassis box 30, with wire harness 74, related components 72, and retaining plate 48 (with installed connectors 10 and 12) comprising an electrical sub-assembly 80 that is to be installed as a unit into the chassis box portion 32 (see also FIG. 5).

Figure 6:
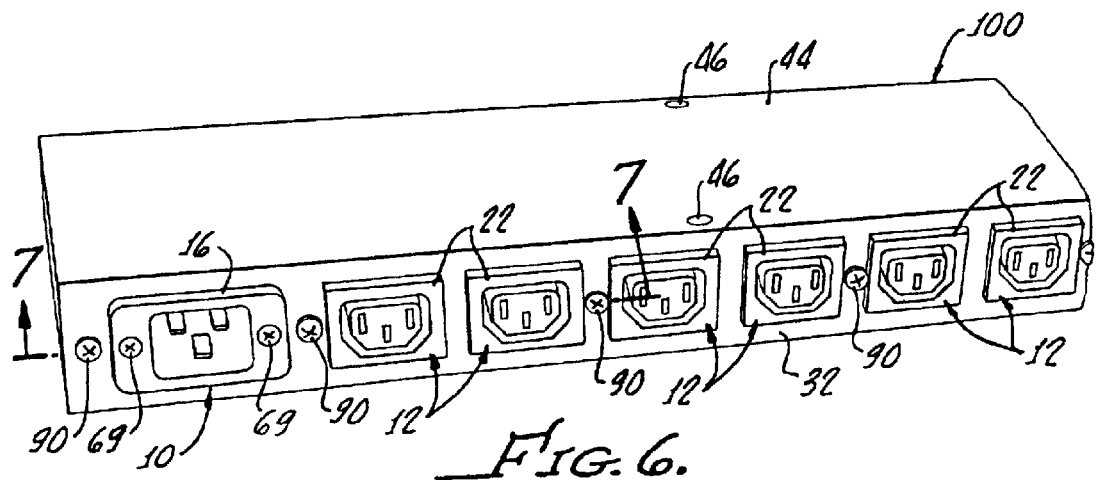
FIG. 6 is a partial perspective drawing of the chassis box of FIG. 2, showing retaining shoulders of the IEC inlet and outlet connectors installed in the retaining plate extending into and through the cutouts in the chassis box rear wall.
Figure 7:
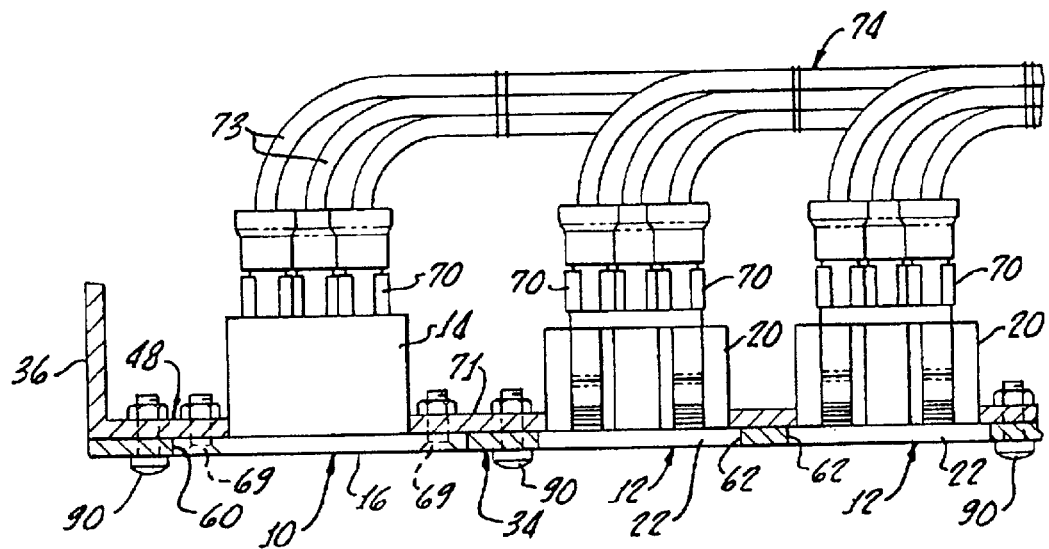
FIG. 7 is a cross sectional drawing taken along line 7—7 of FIG. 6, showing the detachable attachment of the retaining plate to the chassis box rear wall with shoulders of the connectors installed in the retaining plate extending into and through the cutouts in the chassis box rear wall.

With sub-assembly 80 completed outside of box portion 32, the sub assembly is installed into the box portion as depicted in FIG. 6, with electrical component retaining plate front surface 68 against a rear surface 82 (FIG. 7) of chassis box wall 34. In this position of retaining plate 48, connector shoulders 16 and 22 fit into corresponding cutouts 60 and 62 of box wall 34 (see also FIG. 6).

Means 90, such as screws, are then used to detachably attach retaining plate 48 (and hence sub-assembly 80) to inside (rear) surface 82 of chassis box wall 34. Assembly of electrical equipment 100 is completed by the attachment of cover plate 44 to box portion 32 by screws 46 (FIG. 6).

From the foregoing, it is apparent that as to chassis box wall 34, IEC connectors 10 and 12 have been "converted" by retaining plate 48 from front-mounting to rear-mounting. As an important result, electrical connections to connectors 10 and 12 (as well as other associated wiring) has been enabled outside, instead of inside, chassis box portion 32. This enables an easier and more efficient and less costly assembly of electrical equipment 100. In addition, the inspection of sub-assembly 80 while it is still outside of box portion 32 is easier and more reliable.

An additional benefit of the above-described assembly method is that if repairs to equipment 100 are needed, sub-assembly 80 can be readily removed from chassis box 30 (by reversing the above-described installation procedure) for inspection and repair.

Figure 8:
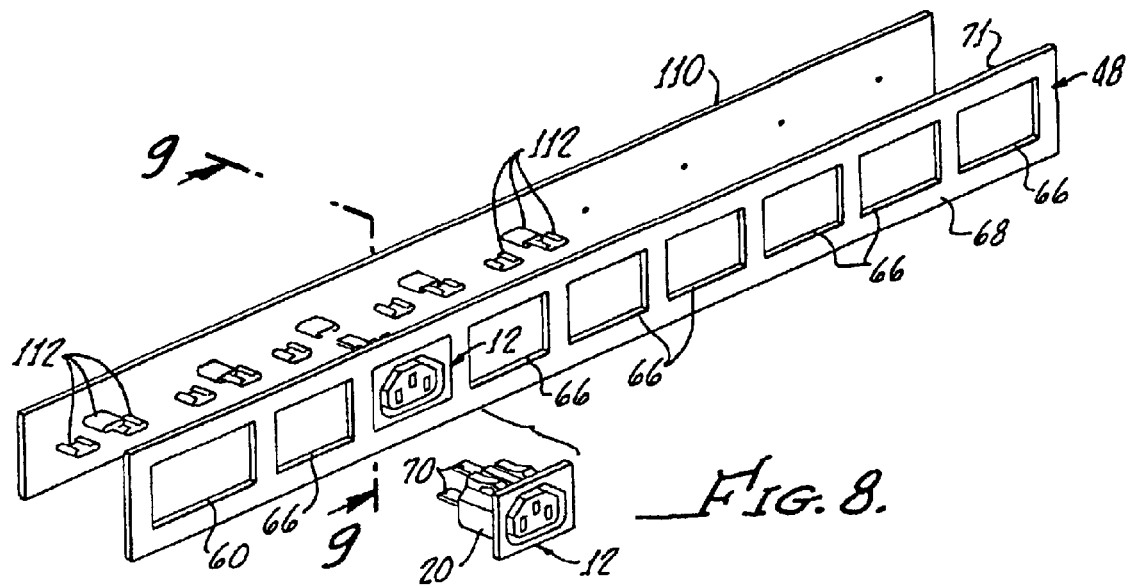
FIG. 8 is a partial perspective drawing of the retaining plate of FIG. 3 showing, for illustrative purposes, a representative IEC outlet connector front mounted in a cutout in the retaining plate and showing a second IEC outlet connector being front mounted into the plate, and further showing a printed circuit card plugged onto the electrical terminals of the installed IEC outlet connector and in position for making electrical connection to all the IEC connectors to be front mounted in the plate in lieu of the electrical wire connections depicted in FIG. 4.
Figure 9:
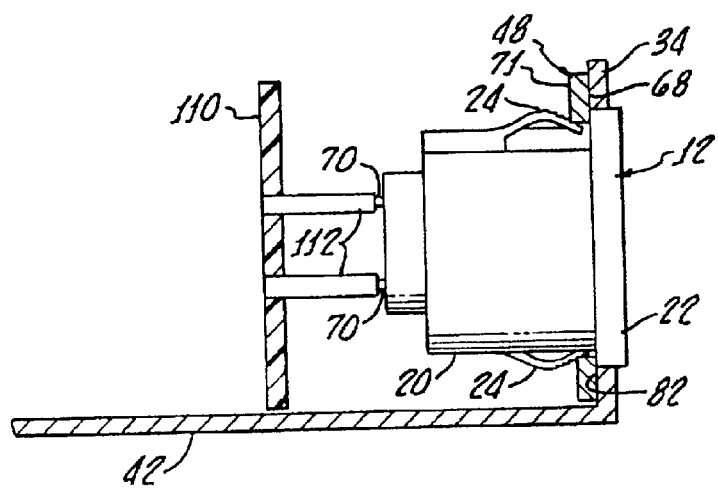
FIG. 9 is a transverse cross sectional drawing taken along line 9—9 of FIG. 8 showing a representative attachment between the printed circuit card and one of the IEC outlet connectors by the use of electric terminal connectors installed in the circuit card.

Variation of FIGS. 8–10:

The present inventor has further determined that additional and substantial economic advantages can often be achieved by replacing with a conventional, but customized, printed circuit card (PCC) 110 (FIGS. 8, 9 and 10) above-described wire harness 74 connections to IEC connectors 10 and 12 mounted in plate 48. PCC 110 is also used to make electrical connection to other electrical components 72 required for installation in chassis box 30.

The use of an electrically-interconnecting PCC corresponding to PCC 110 (instead of hand wiring described above) has been determined to be particularly advantageous for significant manufacturing runs (i.e., long runs) of a particular type of electrical equipment for which the cost of designing and producing the PCC is off-set by the reduced material and assembly costs enabled by the PCCs. Although, when chassis box space and/or weight is at a premium, reduced internal assembly size enabled by the use of PCC interconnections may justify the higher cost of PCC design and fabrication even for short manufacturing runs of the-equipment.

As best shown in FIG. 9, PCC 110 may be fabricated with standard component terminal receptacles 112 located so that the PCC can be detachably attached to and supported by electrical component terminals 70 after retaining plate 48 is attached to chassis box wall 34 by sliding the terminal receptacles onto corresponding ones of the terminals.

An advantage of using PCC-mounted terminal receptacles 112 is that PCC 110 can be readily detached from the electrical components installed in retaining plate 48 (and vice versa) for any necessary PCC repair or component replacement, without having to detach the plate from chassis box wall 34.

As an alternative to mounting terminal receptacles 112 on PCC 110, electrical component terminal receiving apertures may be made in a PCC 110a (FIG. 10A) so that electrical terminals 70 of representative IEC outlet 12 are attached directly to the PCC, as by soldering (including a wave-soldering process). In this case, in the manner described above, representative IEC outlet connector is front mounted into retaining plate 48 that is, in turn, detachably attached to chassis box wall 34 from the inside of chassis box portion 32 with shoulder 22 of the connector received in cutout 62 in the chassis box wall.

Figure 10A:
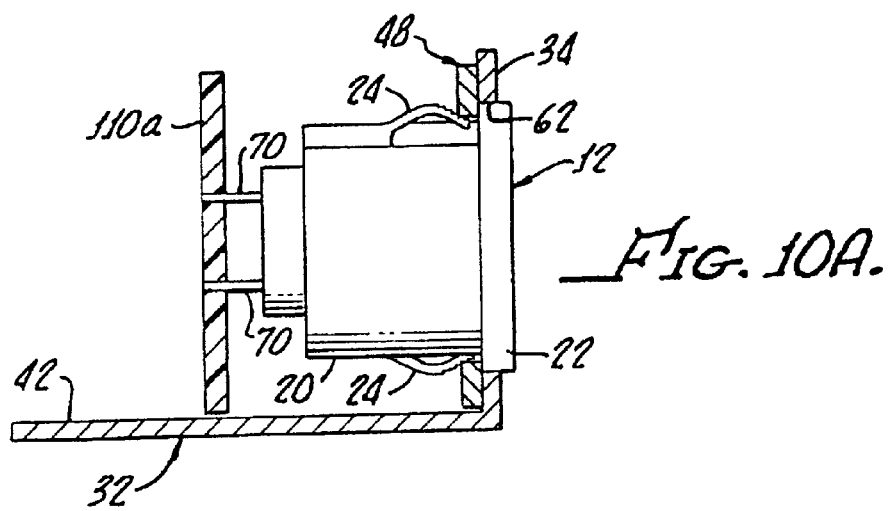
FIG. 10A showing the representative IEC outlet connector front mounted in the retaining plate of FIG. 3 with the retaining plate being attached to a wall of the chassis box from inside the chassis box and with the shoulder of the IEC connector received in a cutout formed in the chassis box wall, and FIG. 10B being similar to FIG. 10A except that the retaining plate is eliminated, the printed circuit card being shown attached to the chassis box wall with screws and stand-off elements with the shoulder of the IEC connector received in a cutout formed in the chassis box wall (but not directly attached to the chassis box wall.
Figure 10B:
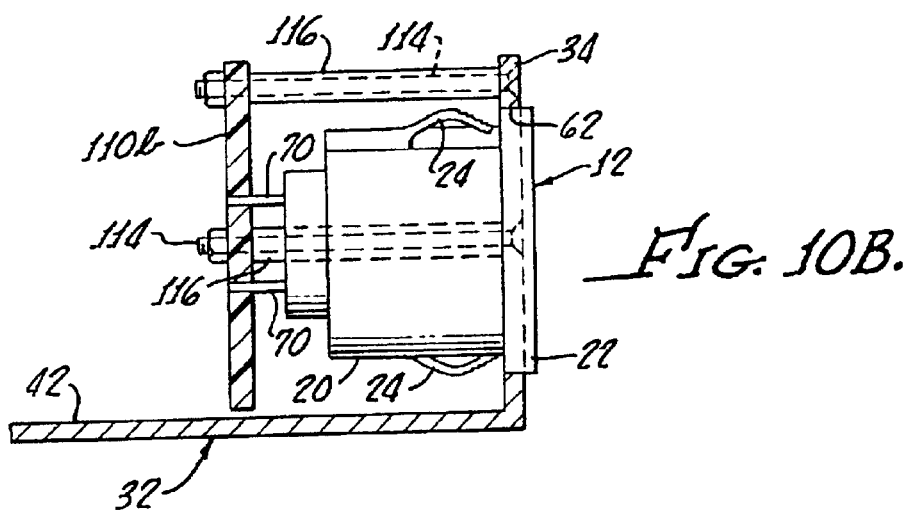
FIG. 10 is a cross sectional drawing similar to FIG. 9, except that the electrical terminals of the representative IEC outlet connector are shown directly installed in the printed circuit card.

It may in some instances be further advantageous, as depicted in FIG. 10B, to detachably attach PCC 110b (which corresponds to PCC 110a depicted in FIG. 10A or PCC 110 depicted in FIG. 9) directly to chassis box wall 34, as depicted, by way of example, by a plurality of screws 114 passing through tubular stand-offs or bushings 116. The location and number of such screws 114 and stand-offs 116 used depending on dimensions of PCC 110b and chassis box wall 34, as well as the number of electrical components involved. It will be appreciated, however, that other types of stand-offs, such as sheet metal brackets, may alternatively be used to detachably attach PCC 110b (or its equivalent) to a corresponding chassis box wall, such as wall 34.

It is seen by comparing FIG. 10B to FIG. 10A that retaining plate 48 has been deleted in FIG. 10B and representative IEC connector 12 is supported by its mounting to PCC 110b with its shoulder 22 supported in cutout 62 in chassis box wall 34. Although, as is seen in FIG. 10B, shoulder 22 of representative connector 12 is still received into cutout 62 in chassis box wall 34 from inside chassis box portion 32, the connector is not attached to the chassis box wall except through its connection to PCC 110b.

Figure 11:
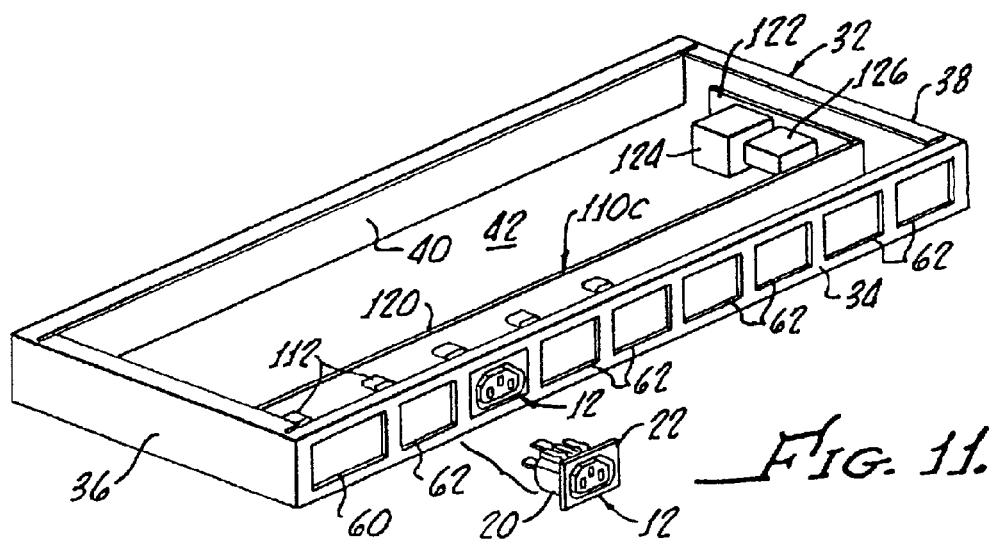
FIG. 11 is a perspective drawing similar to FIG. 8 except that the representative IEC outlet connectors are shown front mounted directly into cutouts in one of the chassis box walls, with the retaining plate eliminated, and showing a printed circuit card installed for making electrical connection to the IEC connector electrical terminals.

Variation of FIG. 11:

The principal objective of the present invention is to effectively convert front-mounting electrical components, such as connectors 10 and 12, to rear mounting by the use of retaining plate 48 in the manner described above. However, FIG. 11 depicts the alternative use of a PCC 110c (or an equivalent PCC) to make direct electrical connections inside chassis box portion 32 with the electrical components front mounted directly into chassis box wall 34 (or other chassis box walls) in the normal manner without the use of electronic component retaining plate 48.

Such use of PCC 110c (or its equivalent) to make electrical connection to chassis box-installed front-mounting electrical components, such as IEC connector 12, may sometimes be feasible and, if so, may be desirable for the construction of particularly compact electrical equipment.

As shown by way of example only in FIG. 11, with no limitation being thereby intended or implied, PCC 110c is made for separation into two electrically interconnected sections 120 and 122. This enables other electrical components 124 and 126 to be board mounted on PCC section 122.

PCC 110c is preferably constructed having preciously-described terminal connectors 112 installed therein (as by soldering) so that the PCC can be readily detachably connected to the electrical components exemplified by IEC connectors 12.

Although there has been described above simplified electrical equipment and methods of assembling such electrical equipment using front mounting electrical connectors, in accordance with the present invention for purposes of illustrating the manner in which the present invention maybe used to advantage, it is to be understood that the invention is not limited thereto. For example, although the use of IEC front-mounting connectors in the assembly method has been illustrated and described, it is to be understood that the present equipment and assembly methods are equally applicable to all other types of front-mounting electrical components and to any mix of different types of electrical components which might be used in the assembly of electrical equipment. Consequently, any and all variations and/or equivalent equipment or methods which may occur to those skilled in the applicable art are to be considered to be within the scope and spirit of the invention as set forth in the claims which are appended hereto as part of this application.

What is claimed is:

1. A method of assembling electrical equipment in a chassis box using front-mounting electrical components, said method comprising the steps of:
   a. providing a front-mounting electrical component having a body and a retaining shoulder at an outside end region of said body and with electrical terminals extending from an inside end region of the body;
   b. forming an electrical component retaining plate sized to attach to an inside surface of a selected wall of said chassis box, said plate having a front surface and a back surface and being formed having a cutout sized for receiving the body of said front-mounting electrical component;
   c. inserting the body of said front-mounting electrical component into said plate cutout from the front side of the plate so as to install the electrical component in said plate with said electrical terminals projecting from the back surface of the plate;
   d. making a cutout in said selected wall of said chassis box, said wall cutout being sized to receive said electrical component retaining shoulder and being located to match said plate cutout; and
   e. attaching said plate to said selected chassis box selected wall with the front surface of said plate against the inside surface of said selected chassis box wall and with the shoulder of said electrical component installed in said plate extending into said wall cutout.

2. The assembly method as claimed in claim 1, including the step of making electrical connections to said electrical component electrical terminals.

3. The assembly method as claimed in claim 2, wherein the step of making electrical connections to said electrical component electrical terminals includes connecting electrical wires to said electrical terminals and bundling said wires into a wiring harness before said plate is attached to said selected chassis box wall.

4. The assembly method as claimed in claim 2, wherein the step of making electrical connections to said electrical component electrical terminals includes connecting a printed circuit card to said electrical terminals.

5. The assembly method as claimed in claim 1, wherein said front-mounting electrical component is selected as an IEC inlet or an IEC outlet.

6. The assembly method as claimed in claim 1, wherein the step of attaching the plate to said chassis box wall includes detachably attaching the plate to the selected chassis box wall.

7. A method of assembling electrical equipment in a chassis box using front-mounting electrical components, said method comprising the steps of:
   a. providing a front-mounting electrical component having a body and a retaining shoulder at an outside end region of said body and with electrical terminals extending from an inside end region of the body;
   b. forming an electrical component receiving plate sized to fit against an inside surface of a selected wall of said chassis box, said plate having a front surface and a back surface and being formed having a cutout sized for receiving the body of said front-mounting electrical component;
   c. inserting the body of said front-mounting electrical component into said plate cutout from the front side of said plate so as to install said electrical component in said plate with said electrical terminals projecting from the back side of said plate;
   d. making a cutout in said selected wall of said chassis box, said wall cutout being sized to receive said electrical component retaining shoulder and being located to match said plate cutout;
   e. connecting electrical wires to said electrical terminals of said electrical component installed in said plate and bundling said electrical wires into a wiring harness; and
   f. detachably attaching said plate to said selected chassis box selected wall with the front surface of said plate against the inside surface of said selected chassis box wall and with the shoulder of said electrical component installed in said plate extending into said wall cutout and with said wiring harness inside said chassis box.

8. A method of assembling electrical equipment in a chassis box using front-mounting electrical components, said method comprising the steps of:
   a. providing a front-mounting electrical component having a body and a retaining shoulder at an outside end region of said body and with electrical terminals extending from an inside end region of the body;
   b. forming an electrical component retaining plate sized to fit against an inside surface of a selected wall of said chassis box, said plate having a front surface and a back surface and being formed having a cutout sized for receiving the body of said front-mounting electrical component;
   c. inserting the body of said front-mounting electrical component into said plate cutout from the front side of said plate so as to install said electrical component in said plate with said electrical terminals projecting from the back side of the plate;
   d. making a cutout in said selected wall of said chassis box, said wall cutout being sized to receive said electrical component retaining shoulder and being located to match said plate cutout;
   e. detachably attaching said plate to said selected chassis box selected wall with the front surface of said plate against the inside surface of said selected chassis box wall and with the shoulder of said electrical component installed in said plate extending into said wall cutout; and
   f. connecting a printed circuit card to said electrical terminals of said electrical component installed in said plate.

9. The assembly method as claimed in claim 8, wherein the step of connecting a printed circuit card to said electrical terminals of said electrical component installed in said plate is performed before the retaining plate is attached to said selected chassis box wall.

10. A method of assembling electrical equipment using front-mounting electrical components, said method comprising the steps of:

a. providing a front-mounting electrical component having a body with a retaining shoulder at an outside end region of the body and having electrical terminals projecting from an inside end region of the body;

b. providing an equipment enclosure having sides, a selected one of said sides having a cutout sized to receive the retaining shoulder of said front-mounting electrical component;

c. connecting a printed circuit card to said electrical terminals of said electrical component for making electrical connections to said terminals; and d. attaching said printed circuit card to said enclosure with the printed circuit card inside said enclosure and with said electrical component shoulder received into said cutout in said selected one of said enclosure sides from inside the enclosure.

11. The assembly method as claimed in claim 10, wherein the step of connecting a printed circuit card to said electrical terminals of said electrical component includes soldering said electrical terminals of said electrical component to said printed circuit card.

12. The assembly method as claimed in claim 10, wherein the step of connecting a printed circuit card to said electrical terminals of said electrical component includes detachably connecting the printed circuit card to said electrical terminals.

13. The assembly method as claimed in claim 10, wherein the step of attaching the printed circuit card to said enclosure includes attaching the printed circuit card to said selected one of said enclosure sides.

14. The assembly method as claimed in claim 13, wherein the step of attaching the printed circuit card to said selected one of said enclosure sides includes attaching the printed circuit card to the selected one of said enclosure sides by a plurality of screws and stand-offs.

* * * * *